(12) United States Patent
Nisenzon

(10) Patent No.: US 9,729,857 B2
(45) Date of Patent: Aug. 8, 2017

(54) HIGH RESOLUTION DEPTH MAP COMPUTATION USING MULTIRESOLUTION CAMERA CLUSTERS FOR 3D IMAGE GENERATION

(71) Applicant: Semyon Nisenzon, Palo Alto, CA (US)

(72) Inventor: Semyon Nisenzon, Palo Alto, CA (US)

(73) Assignee: Semyon Nisenzon, Palo Alto, CA (US)

( * ) Notice: Subject to any disclaimer, the term of this patent is extended or adjusted under 35 U.S.C. 154(b) by 246 days.

(21) Appl. No.: 14/515,552

(22) Filed: Oct. 16, 2014

(65) Prior Publication Data
US 2015/0288945 A1 Oct. 8, 2015

Related U.S. Application Data

(60) Provisional application No. 61/976,566, filed on Apr. 8, 2014.

(51) Int. Cl.
*H04N 13/02* (2006.01)

(52) U.S. Cl.
CPC ....... *H04N 13/0242* (2013.01); *H04N 13/025* (2013.01); *H04N 13/0271* (2013.01)

(58) Field of Classification Search
USPC .......................................................... 348/48
See application file for complete search history.

(56) References Cited

U.S. PATENT DOCUMENTS

| | | | | |
|---|---|---|---|---|
| 2003/0190072 A1* | 10/2003 | Adkins | ..................... | G06T 5/50 382/154 |
| 2004/0184160 A1* | 9/2004 | Nishina | ................ | G02B 15/173 359/690 |
| 2010/0141651 A1* | 6/2010 | Tan | ........................ | G06T 7/0071 345/420 |
| 2010/0182410 A1* | 7/2010 | Verburgh | .............. | G06T 7/0071 348/51 |
| 2011/0032341 A1* | 2/2011 | Ignatov | .............. | H04N 13/0033 348/51 |
| 2011/0069152 A1* | 3/2011 | Wang | .................... | G06T 7/0081 348/43 |
| 2011/0141237 A1* | 6/2011 | Cheng | .................. | H04N 13/026 348/46 |
| 2011/0188773 A1* | 8/2011 | Wei | .......................... | G06K 9/40 382/260 |
| 2011/0285813 A1* | 11/2011 | Girdzijauskas | .... | H04N 13/0011 348/42 |
| 2012/0141016 A1* | 6/2012 | Wildeboer | ......... | H04N 13/0271 382/154 |
| 2013/0107015 A1* | 5/2013 | Morioka | .............. | H04N 13/025 348/48 |

(Continued)

*Primary Examiner* — Leron Beck

(74) *Attorney, Agent, or Firm* — Prakash Nama; Global IP Services, PLLC

(57) ABSTRACT

Techniques for generating 3D images using multi-resolution camera clusters are described. In one example embodiment, the method includes, disposing a multi-resolution camera set including a central camera, having a first resolution, and multiple camera clusters, having one or more resolutions that are different from the first resolution, that are positioned substantially surrounding the central camera. Images are then captured using the camera set. A high resolution depth map is then computed using a hierarchical approach on the captured images. The 3D image of the captured image is then generated using the computed high resolution depth map.

23 Claims, 19 Drawing Sheets

(56) References Cited

U.S. PATENT DOCUMENTS

2014/0055621 A1* 2/2014 Shirani .................. H04N 7/18
348/159
2014/0146139 A1* 5/2014 Schwartz ........... H04N 13/0018
348/43
2015/0042767 A1* 2/2015 Ciurea ............... H04N 13/0242
348/48

* cited by examiner

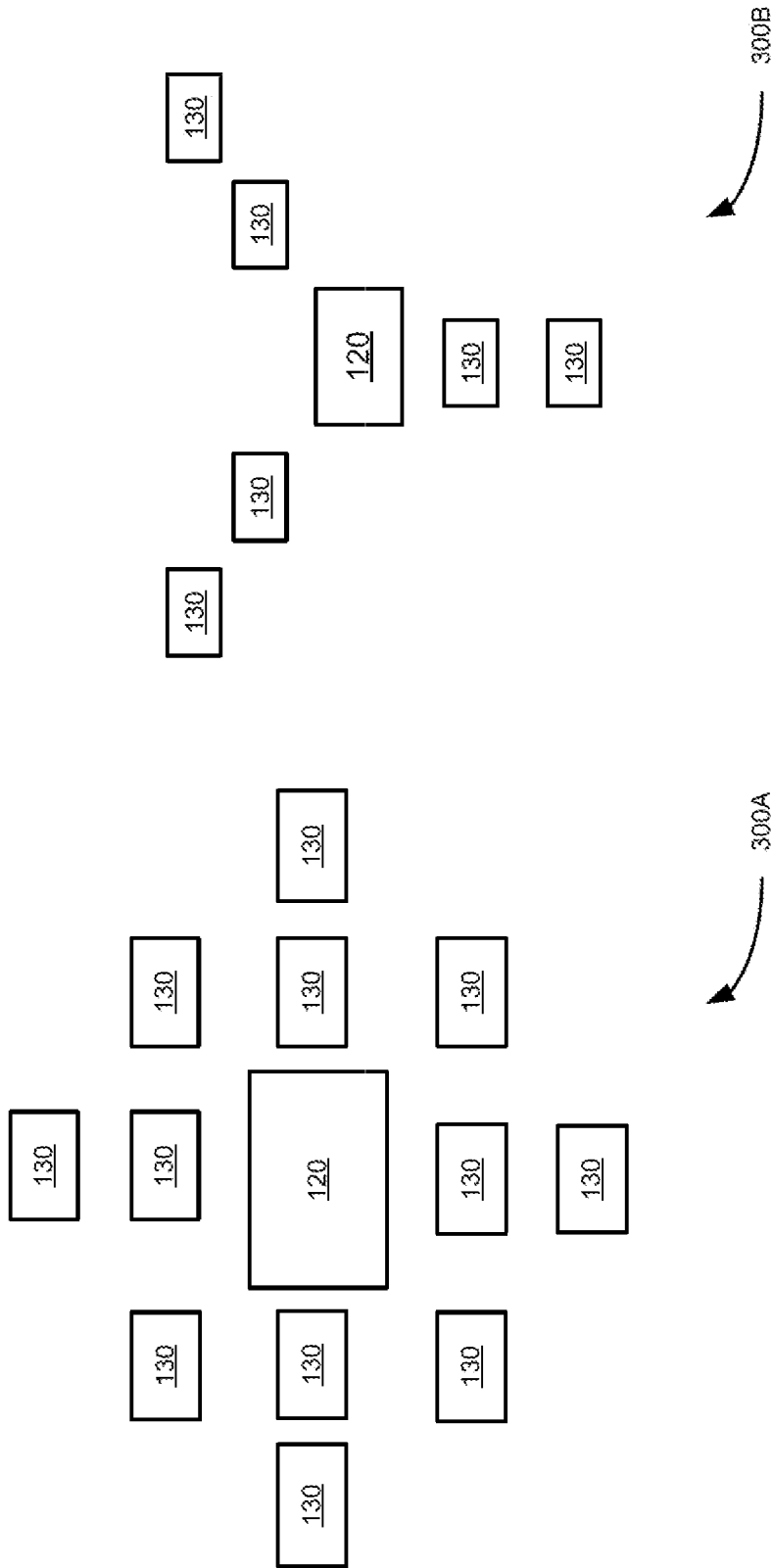

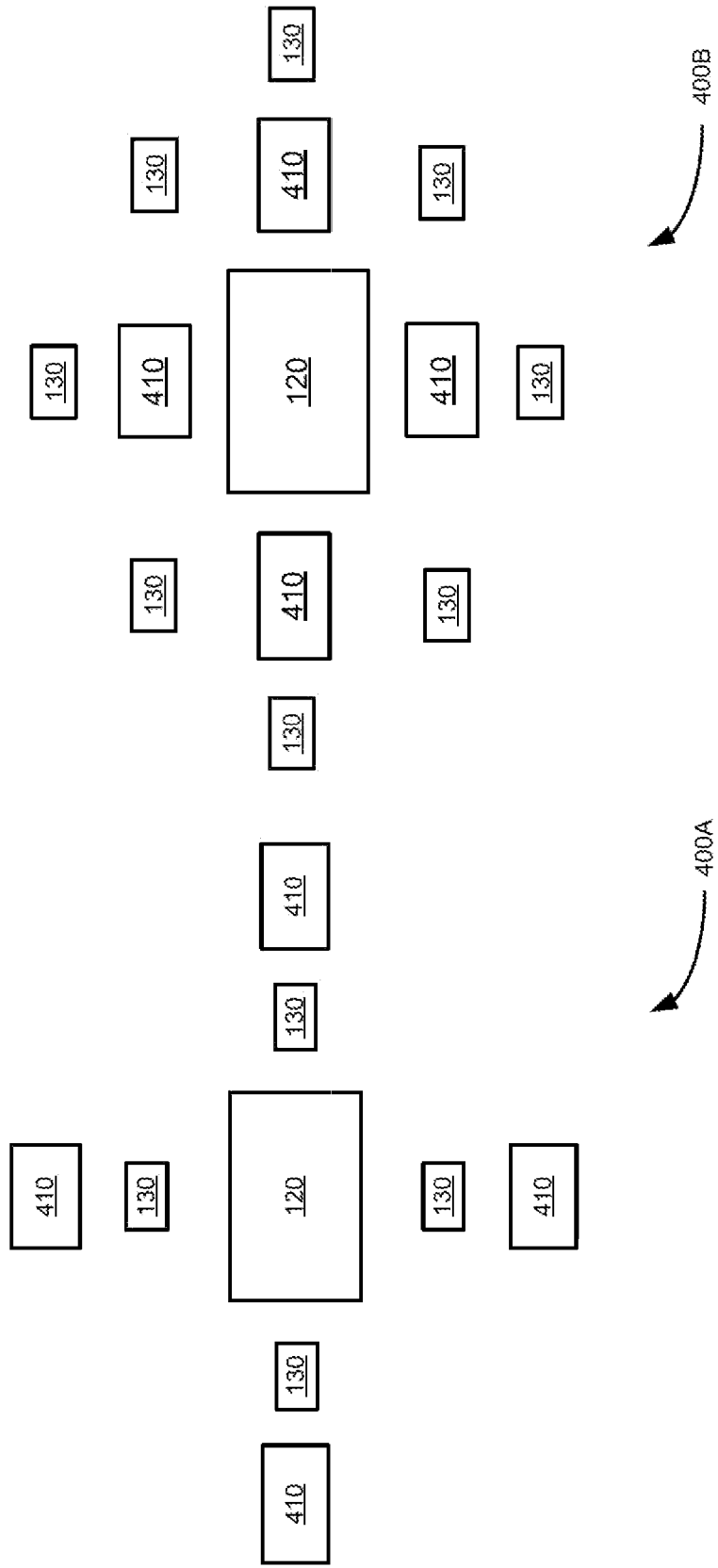

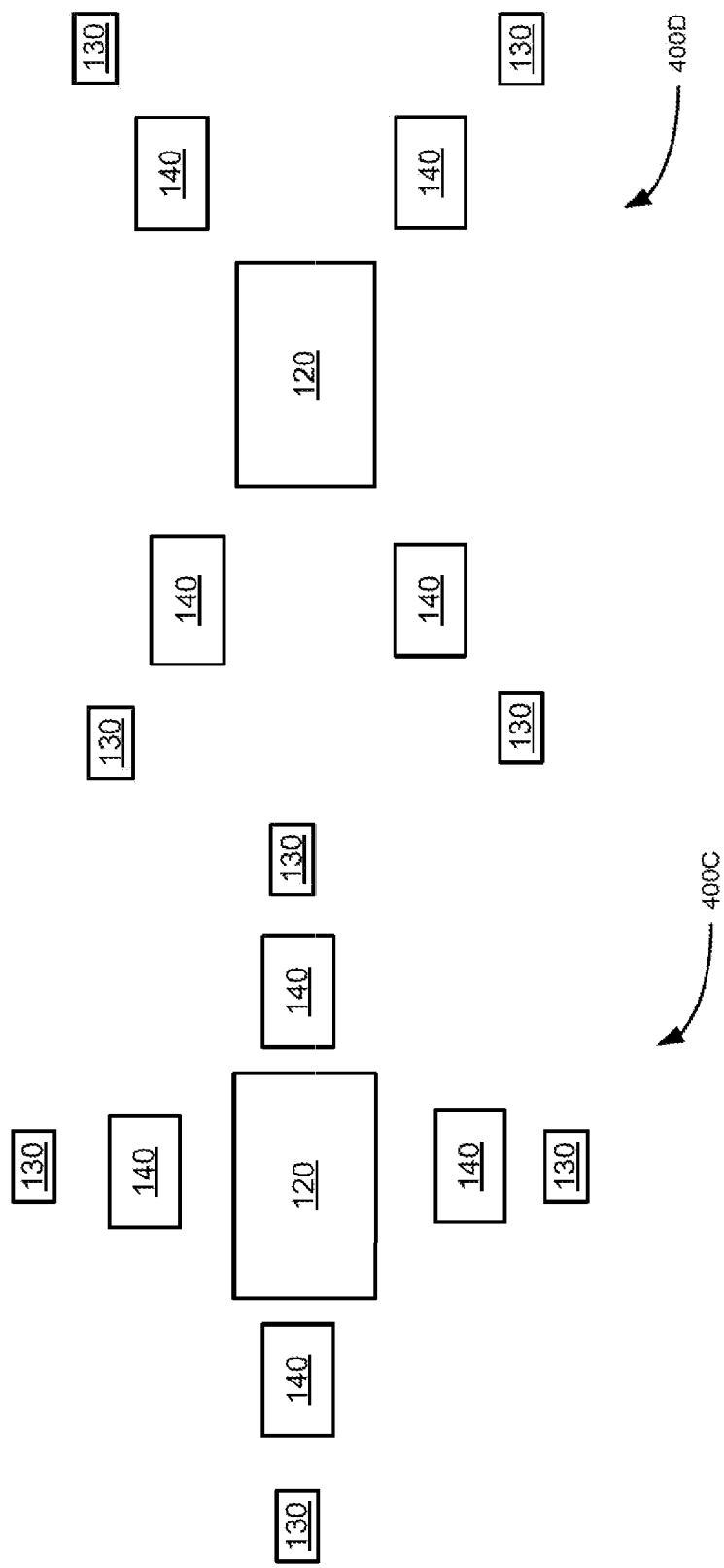

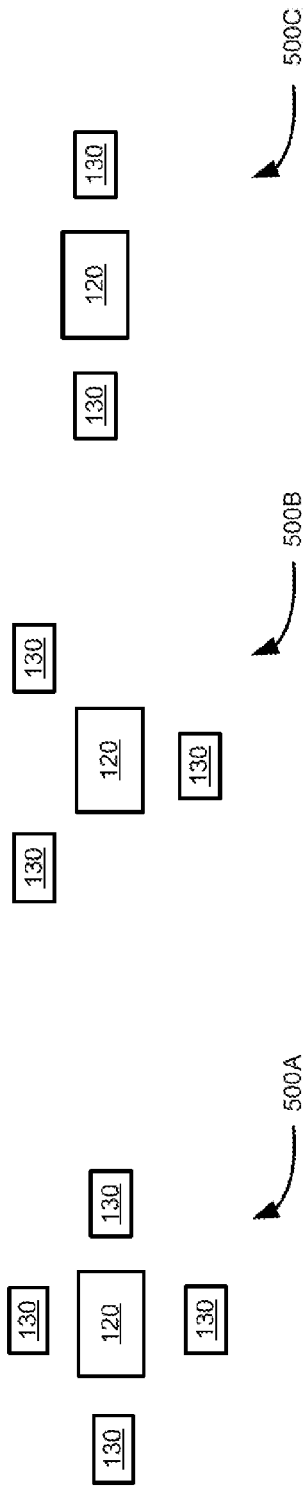

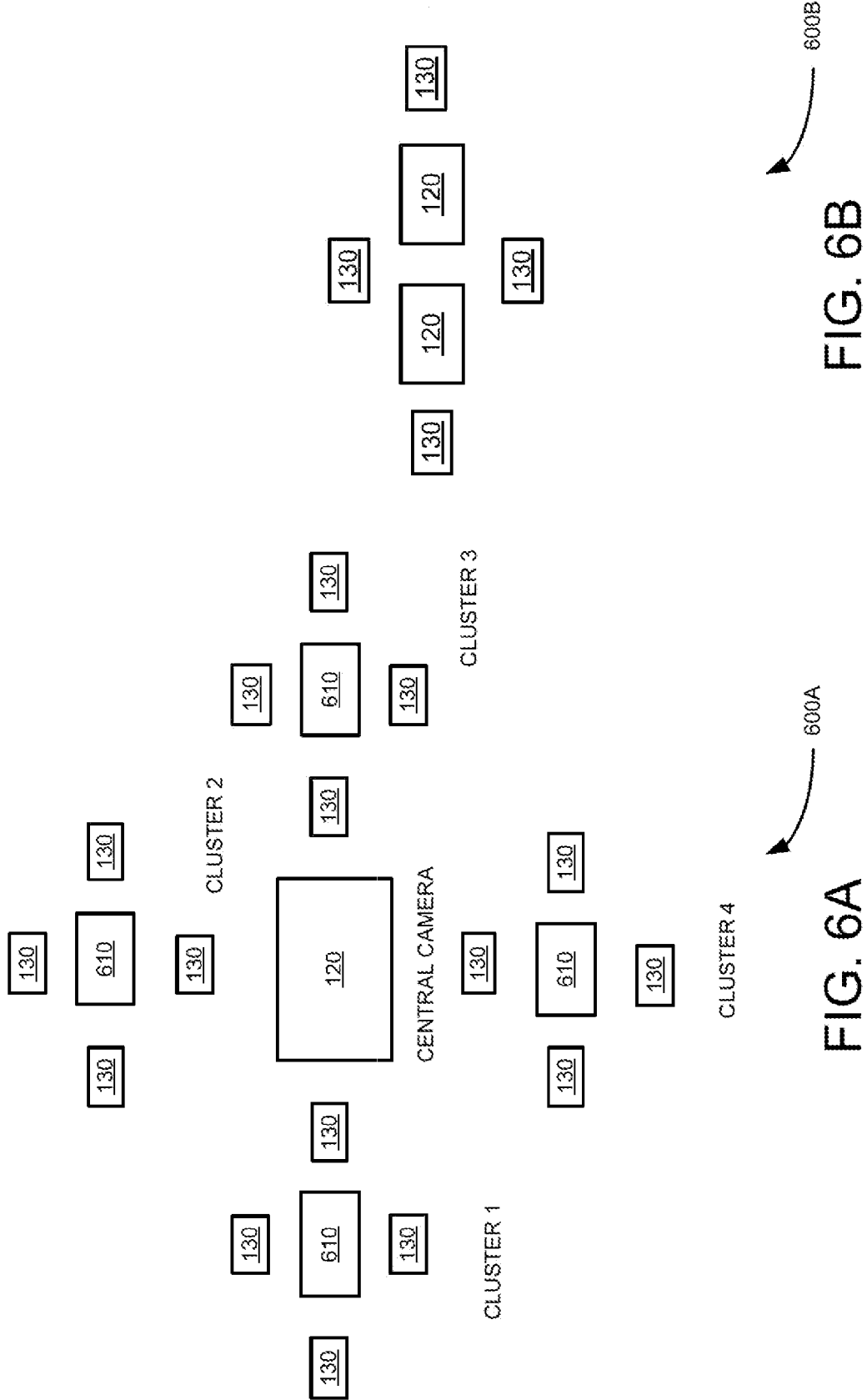

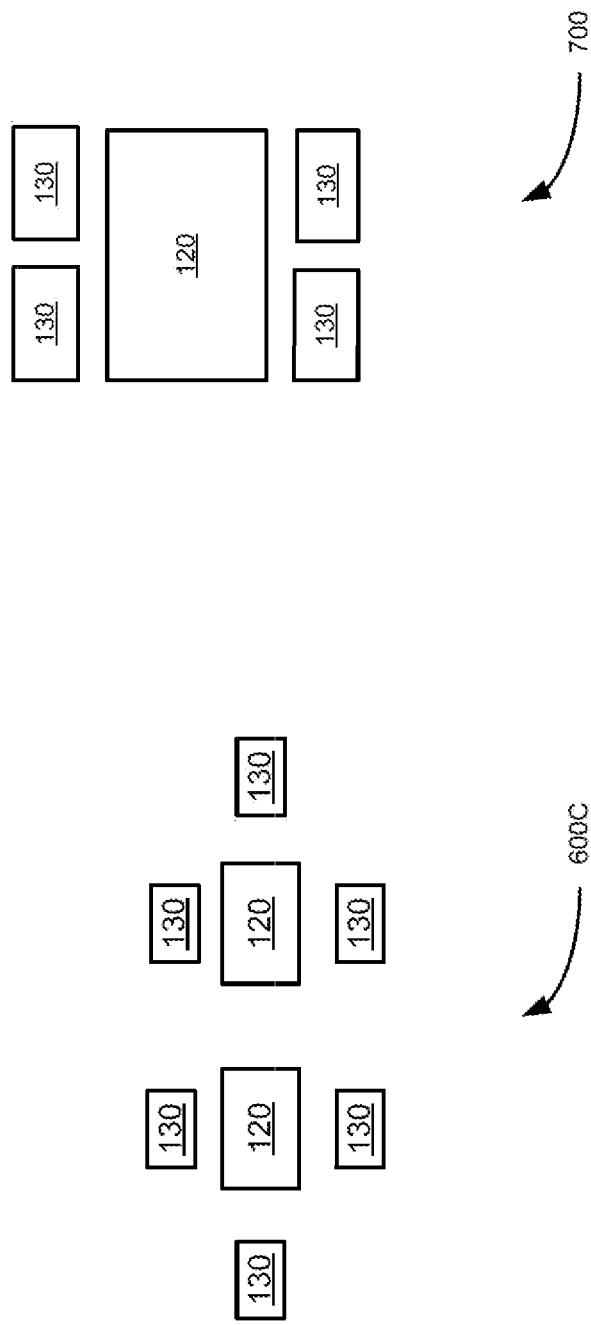

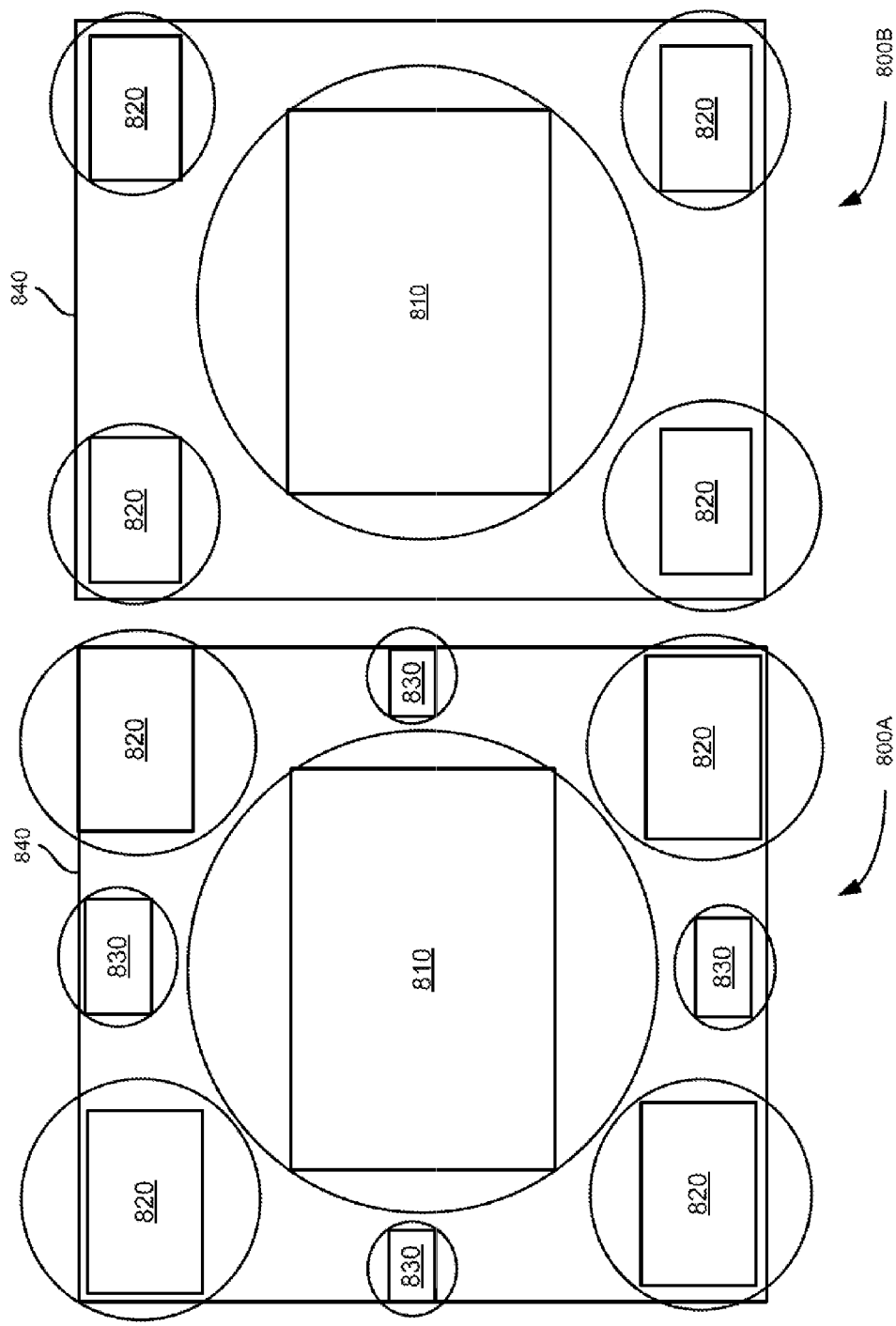

HIGH RESOLUTION DEPTH MAP COMPUTATION USING MULTIRESOLUTION CAMERA CLUSTERS FOR 3D IMAGE GENERATION

CROSS-REFERENCE TO RELATED APPLICATION

This application claims the benefit of U.S. Provisional Application No. 61/976,566, filed Apr. 8, 2014.

BACKGROUND

High quality, computationally-tractable 3D from images is a critical and essential enabler for many application markets. Two human eyes see a scene from different positions, thus giving us a sense of depth of the scene. The differences between the two views of the scene, called binocular disparity, allow our brain to calculate the depth for every point on the scene visible by the two eyes. A similar result could be achieved by using two cameras simultaneously capturing the scene and then comparing the two resulting images in order to compute depth information. This could be accomplished by moving individual pixels of one image to match pixels on another image. The degree of movement necessary, called disparity, depends on the distance from the cameras to the object resulting in the particular pixel pair, and also depends on the distance between the two cameras. The goal is to fine tune the best match of pixels from different cameras in order to calculate the most accurate depths.

There are several implementations using large, number of cameras organized in two-dimensional arrays. One example implementation is Stanford Multi-Camera arrays. These arrays capture light fields defined as a set of two-dimensional (2D) images capturing light from different directions for the whole scene. Using a larger number of cameras increases the accuracy of the depth map obtained. Another example implementation of camera arrays is the Pelican Imaging system which uses set of low resolution R, G, and B cameras positioned directly on top of image sensor chip. Both these systems are using lower resolution depth maps in order to obtain higher resolution RGB images, sometimes called super-resolution images.

For traditional cameras, depth of field depends on the so-called F ratio of the lens, which is the ratio of the focal length of the camera lens to the width of the lens aperture. Depending on the F ratio, there can be a particular range of distances from the camera on either side of the focal plane in which the image is sharp. Because a camera set produces three-dimensional (3D) images, which includes 2D color images plus we can compute the depth for every pixel of the image which called depth map. Using depth map and color image closed to all-in-focus it is possible to generate all in focus image. It is also possible to produce images with different synthetic aperture (level of blurring outside of in focus area), and also to control areas of the image, which are in focus (synthetic depth of field). This could be accomplished at any selected depth after the image had been shut. This feature is being called dynamic refocusing. The maximum synthetic aperture could be defined by size of camera set, synthetic apertures of the individual cameras as well as the accuracy of the generated depth map.

Generally, camera arrays use multiple cameras of same resolution and as a set; camera arrays contain information that allows generating an output image at a resolution higher than the original cameras in the camera array, which is, typically, called as super-resolution images. Generation of super-resolution images by camera arrays have to overcome number of challenges. The most important challenges area handling of occlusion areas, holes, accuracy and resolution of depth map, total number of computations to be performed (computational complexity), and/or occlusions.

Occlusions are one of the fundamental complications in generation of Super-resolution images using camera arrays are the occlusions. Occlusions are the areas which are seen by some of the cameras, but are not visible from the view of the other cameras because they are in the "shadow" of the other parts of the image (other objects in the image). Depth calculation requires at least two cameras seeing the same pixel. Special handling of occluded zones requires a determination of which cameras see a particular pixel and discarding information from the camera or cameras for which this pixel is occluded. It is possible that some of the pixels are seen by only one camera, and for such pixels depth cannot be determined.

Holes are parts of the image where it is not possible to determine depth map. An example is where there are flat areas in the image that do not have discernible textures, so there is no specific information within this area that will allow matching of pixels from different cameras, and therefore depth cannot be determined. The other special area is related to some special occlusion cases where there could be pixels which are visible only by central camera. For both of these cases, generation of super-resolution images will fail for some areas of the image and will create holes, which could be filled later with some level of success by quite sophisticated heuristic interpolation methods.

Traditional camera array techniques include using one of the cameras as a reference camera and then for each pixel of reference camera perform parallax shift operation on other cameras in order to determine depth at this pixel. Parallax shift for any given pixel depends on actual 3D position of this pixel and the distance between the cameras. This process usually involves performing parallax shift for number of depths. Conceptually, parallax shift is performed for each of these depths for all participating cameras in the camera array and then so called "cost function" for this depth is being generated. Then the depth with the minimal cost function will be defined as the depth for this pixel. Different implementations are using number of additional techniques for final determination of pixel depth. One of the objectives of these techniques is to find absolute minimum of cost function and to avoid the use of local minimum of cost function as a final depth for given pixel.

Initial depth set could be selected to minimize computations and the final depth could be refined by repeating the depth search for the new set of depths close to initial pixel depth. At the end of this process final depth for every pixel at reference camera position (excluding holes) is being determined and depth map is being formed. The resolution of this final depth map is typically the resolution of the reference camera.

The importance of getting accurate depth map for the generation of super-resolution images cannot be overestimated. The depth map is used to superimpose all images from the camera array onto the super resolution grid. Any error in the depth map will cause the placement of pixels from other than the reference camera in the wrong position, causing image artifacts. Usually such artifacts are more visible for areas that are closer to the cameras, resulting in big disparities, because the parallax shift for pixels corresponding to them is larger. This is especially true when a camera array consists of mono-color R, G and B cameras, because placing a color pixel at the wrong place can be highly visible to the human eye.

However, determining final depth map using existing techniques produce depth map having the same resolution of the cameras in the camera array, which is, typically, lower than the super-resolution of output image and such low resolution depth maps may be computationally intensive and could be very expensive both in terms of the total number of parallax computations for a large number of depths, and also due to the fact that the large number of images from different cameras being used simultaneously puts a lot of pressure on efficient memory use. Further, the use of high-resolution camera arrays may significantly increase hardware costs as well. Furthermore, existing techniques may require using laser or TOF systems that may be expensive, too big and may result in inflexible industrial design constraints.

SUMMARY

One or more embodiments disclosed herein provide a method for generating a three-dimensional (3D) image using multi-resolution camera clusters. In one aspect, the method includes, disposing a multi-resolution camera set including a central camera, having a first (high) resolution, and multiple camera clusters, having one or more smaller resolutions cameras that are different from the first resolution, that are positioned substantially surrounding the central camera. Images are then captured using the camera set. A high resolution depth map which has the substantially same resolution of the central camera is then computed using a hierarchical approach on the captured images. The 3D image of the captured image is then generated using the computed high resolution depth map.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a computing device. The instructions, when executed in a computing device, perform the steps for generating 3D images using multi-resolution camera clusters.

Embodiments of the present disclosure provide three implementations of multi-resolution camera clusters. In the first implementation, camera clusters are formed by using set of individual camera modules. In the second implementation, individual camera modules including lenses and sensors are disassembled and placed in two separate specially machined holders: one for all lenses and one for all sensors. Then these holders are aligned to insure that lenses are properly positioned on top of their sensors. This implementation could be more compact and will allow to have consistent and precise positioning of lenses and sensors. In the third implementation, which is a wafer based solution; camera clusters are formed by using set of different resolution lenses that are disposed substantially on top of a single wafer including a camera sensor. Overall system can consist of one or several wafer based camera clusters. Specific patterns of camera clusters and their relative positioning for the first, second and third cluster implementations are also part of this disclosure. Embodiments of the present disclosure provide an embedded mobile computing device. The embedded mobile computing device includes multi-resolution camera cluster, a processor and memory. The memory includes a 3D image generation module, wherein the 3D image generation module is configured to generate 3D images using the multi-resolution camera cluster.

Further, embodiments of the present disclosure provides methods of integration of the camera cluster based camera solutions as an integrated part of the current mobile devices, such as cell phones, tablets and/or laptops using resources of such devises, such as their mage Sensor Processors (ISP), General Processors, GPU and memory or they can be organized as a separate units. Such separate units could be used as part of camera security systems, or they can be attached to Cell phones, Computers, TV, and so on using USB, wirelessly, and/or other such connectivity options.

Furthermore, embodiment of this present disclosure provides techniques to organize the use of separate camera cluster modules in combination with digital single lens reflex (DSLR) cameras and high end digital still cameras (DSCs). In one embodiment, this could be accomplished by attaching camera cluster to DSLR using DSLR flash interface to allow DSLR camera and camera cluster module to take simultaneous shots of the images using flush interface as a synchronization mechanism.

BRIEF DESCRIPTION OF THE DRAWINGS

FIGS. 3A and 3B are block diagrams illustrating another example two resolution size camera or single cluster camera set using radial pattern of camera positioning on a rectangular grid and a radial grid, respectively, according to an example embodiment.

FIGS. 4A to 4D are block diagrams illustrating three resolution size camera cluster or single cluster camera set using rectangular and radial pattern of camera positioning, according to an example embodiment.

FIGS. 5A to 5F are block diagram illustrating additional example camera clusters using radial pattern of camera positioning.

FIG. 6A is block diagram of a three resolution size camera set using four radially positioned camera clusters, according to an example embodiment.

FIGS. 6B and 6C are block diagrams depicting six and eight camera clusters respectively, for stereo applications, accordingly to an example embodiment.

FIG. 7 is block diagram of a two resolution size cluster or single cluster camera set formed by lenses disposed directly on top of an image sensor chip/wafer, according to an example embodiment.

FIGS. 8A to 8C are block diagrams of example two and three resolution camera clusters or a single cluster camera set formed by lenses disposed directly on top of an image sensor chip/wafer, accordingly to an example embodiment.

DETAILED DESCRIPTION

Figure 1:
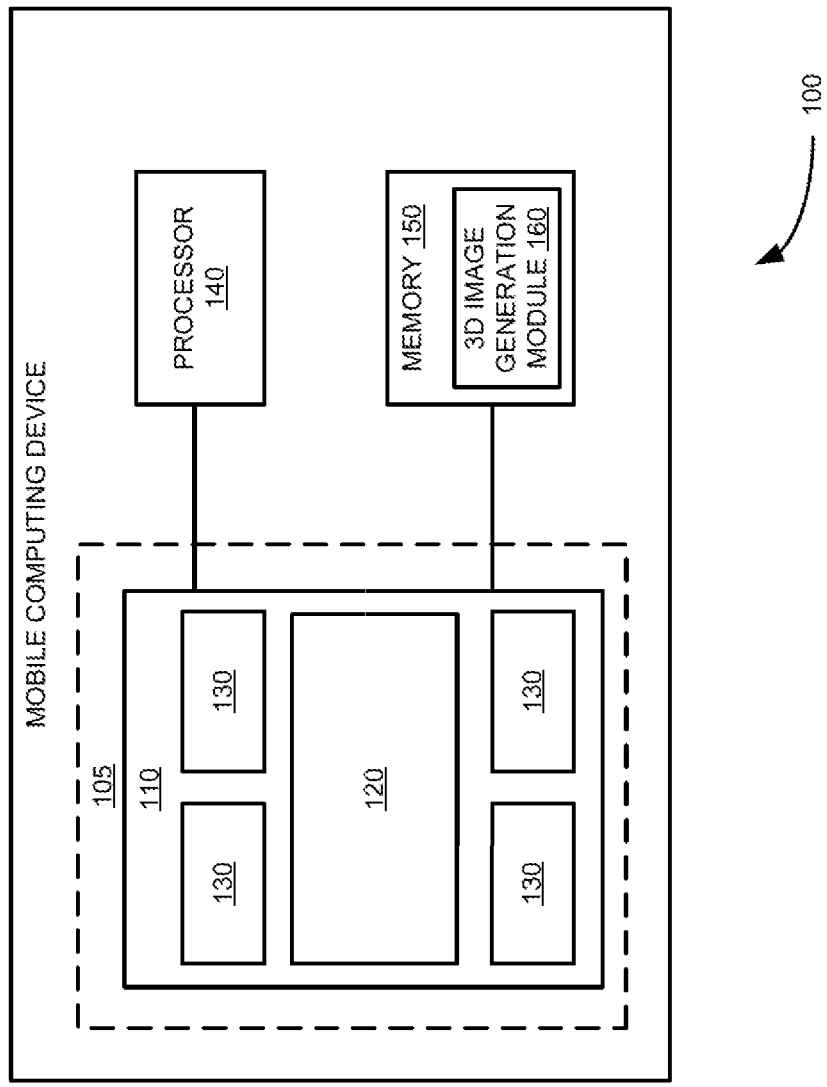
FIG. 1 is a block diagram illustrating system for generating three-dimensional (3D) images using multi-resolution camera cluster, according to an example embodiment.
Figure 2B:
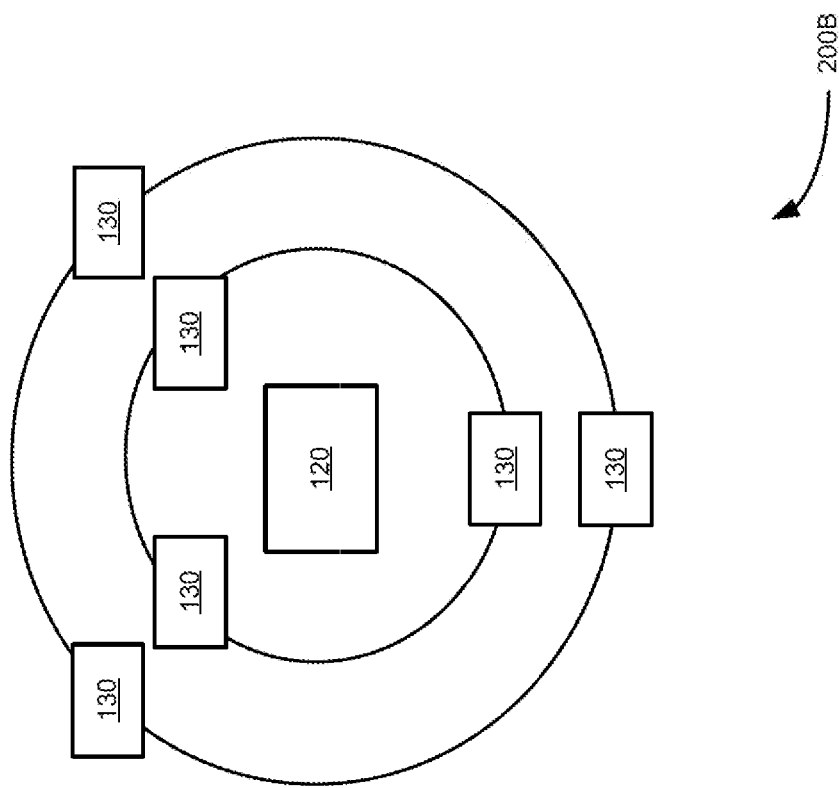
FIGS. 2A and 2B are block diagrams illustrating an example two resolution size camera cluster or single cluster camera set using radial pattern, according to an example embodiment.
Figure 2A:
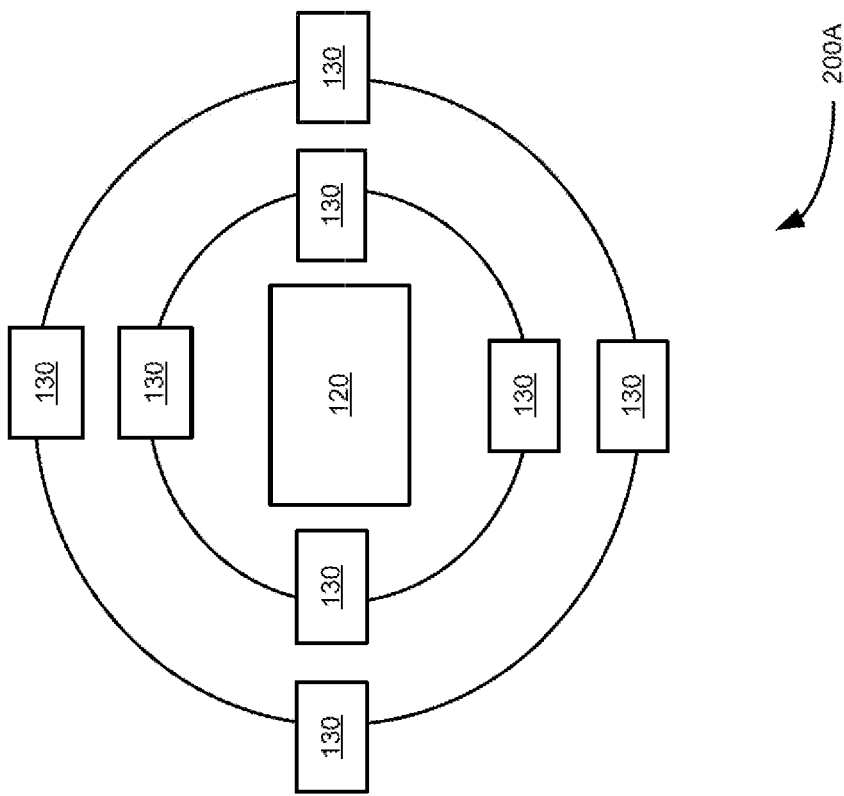

Embodiments described herein provide a technique for generating high-resolution three-dimensional (3D) images using multi-resolution camera cluster. The technique minimizes hardware and processing costs associated with generating 3D images using camera array including different size cameras, such as a single or dual high-resolution cameras (big camera) surrounded by multiple lower resolution cameras (smaller cameras). The physical implementation of this technique may be accomplished in three ways: the first as a set of individual cameras modules when each camera module consists of its own combination of lenses and image sensor; the second represents two holder solution, where individual camera modules including lenses and sensors are disassembled and placed in two separate specially machined holders: one for all lenses and one for all sensors. Then these holders are aligned to insure that lenses are properly positioned on top of their sensors. This implementation could be more compact and will allow to have consistent and precise positioning of lenses and sensors. In the third implementation, and the third as a "monolithic wafer solution" where multi-resolution cluster of lenses is being placed on the top of single large wafer and each lens from the cluster is being projected on its own part of the wafer. Also, the technique is configured for use in multiple application domains, as integrated solution in mobile computing devices, such as point-and-shoot cameras, laptops, tablets and mobile phones; in security cameras; as separate camera cluster modules devices connected to DSLR and DSC cameras using camera flash interface or wireless connections; as separate camera cluster modules devices connected desktop computers, televisions (TVs) or game boxes either wirelessly or using, universal serial bus (USB) or high-definition multimedia interface (HDMI).

The use of technique of multi-resolution clusters optimizes generation of depth maps and occlusion determination. Furthermore, the technique provides 3D imaging platform for multitude of 3D imaging techniques and applications. In addition, the technique uses combination of RGB Bayer pattern cameras and Clear Color Cameras, where all pixels do not have color (clear) Bayer cameras could leverage existing image sensor processing (ISP) hardware. In addition, the replacements of some lower resolution RGB cameras in camera clusters by clear color cameras provides the following advantages: a. clear cameras provide the intensity level for every pixel and have higher effective resolution compared to RGB cameras, which require demosaicking processing by ISP resulting in lower actual resolution compared to corresponding clear code cameras in clusters, which in-turn reduces both hardware costs and computations; b. clear color cameras can be used directly in depth map generation without initial color processing by ISP, which substantially reduces computations; c. clear color cameras deliver more light to the sensor's pixels than corresponding RGB cameras, which increases image quality in low light conditions Moreover, the "monolithic wafer solution" of multi-resolution cluster technique uses optical lens clusters on top of monolithic sensor to greatly reduce size, power consumption, bus bandwidth and manufacturing costs to provide a compact 3D imaging solution targeted to mobile computing devices, such as cell phones and tablets. The technique provides a wafer based camera cluster patterns and innovative hierarchical algorithms that are amicable to computational and power challenges for embedded computational photography applications. The technique further provides metadata for extending existing image formats for storing combined 3D and complimentary cluster information. The technique furthermore provides efficient 3D image generation using camera clusters that is amicable to a many applications, such as capturing 3D scenes using mobile devices, 3D printing, automotive and security related applications and the like.

The term "cluster" or "camera cluster" are applied with respect to a camera set consisting of cameras with different resolutions, while the camera "array" is being used to refer to a set of cameras having the same resolution.

Specific cluster patterns implemented using this method provide the foundation of efficient implementation for different applications. They reflect the balance between the overall cost of software and hardware and the resulting quality of depth maps and output image. Some applications are limited by the costs while others require higher depth map resolution and image quality. The cost of cluster implementation using set of individual camera modules depends on number of cameras used in the cluster. The higher resolution camera modules cost more than lower resolution modules. The cost of monolithic wafer solution depends on the overall size of the wafer and percentage of silicon utilization (pixel areas which actually receive lights through lenses) depends on size and specific position of lenses relative to each other. The depth map resolution and image quality is increases with number of cameras in cluster and their resolutions The use of independent camera cluster module with DSLR and high end DSC cameras require high quality and high resolution depth maps. It is important that camera cluster module is close to the DSLR or DSC camera but is not obscured by its lenses. The camera cluster and the DSLR require making shots at the same time. Replacing DSLR flash with camera cluster module and attaching it to the flash connector allows using existing flash interface. DSLR flashes are n designed not to be obscured by the DSLR lenses and if cluster is physically positioned at the same distance from the DSLR camera as the flash module. DSLR lenses do not obscure the view of the camera cluster module. One or more camera cluster modules could also be connected to DSLR or DSC camera wirelessly and be controlled by DSLR using the same interface as flush.

System Overview and Examples of Operation

FIG. 1 is a block diagram illustrating system for generating 3D images using multi-resolution camera clusters 100, according to an example embodiment. As shown in FIG. 1, a mobile computing device 100 includes a multi resolution camera set 105, a processor 140 and memory 150 that are communicatively coupled with each other. Further as shown in FIG. 1, the multi-resolution camera set 105 includes a central camera 120, having a first resolution, and a camera cluster 130, having one or more resolutions that are different from the first resolution, that are positioned substantially surrounding the central camera. In the example embodiment shown in FIG. 1, the central camera 120 and camera cluster 130 are formed using lenses that are disposed directly on an image sensor 110 formed using a semiconductor wafer chip. In addition as shown in FIG. 1, a 3D image generation module 160 resides in the memory 150. Example multi-resolution camera set 105 including camera clusters are illustrated in FIGS. 2 through 8.

In operation, 3D image generation module 160 captures images using the multi-resolution camera set. The 3D image generation module 160 then computes a high resolution depth map using a hierarchical approach on the captured images. In some embodiments, 3D generation module uses the hierarchical approach by first computing low-resolution depth maps using captured images associated with camera clusters having lower resolution in the camera set using relatively small depths. The 3D generation module then refines the computed low-resolution depth maps. The 3D generation module then computes a high-resolution depth map using the captured images associated with the central camera and central cameras of each of the multiple camera clusters and the refined computed low-resolution depth maps. The 3D generation module then generates the 3D image of the captured image using the computed high resolution depth map.

Figure 8C:
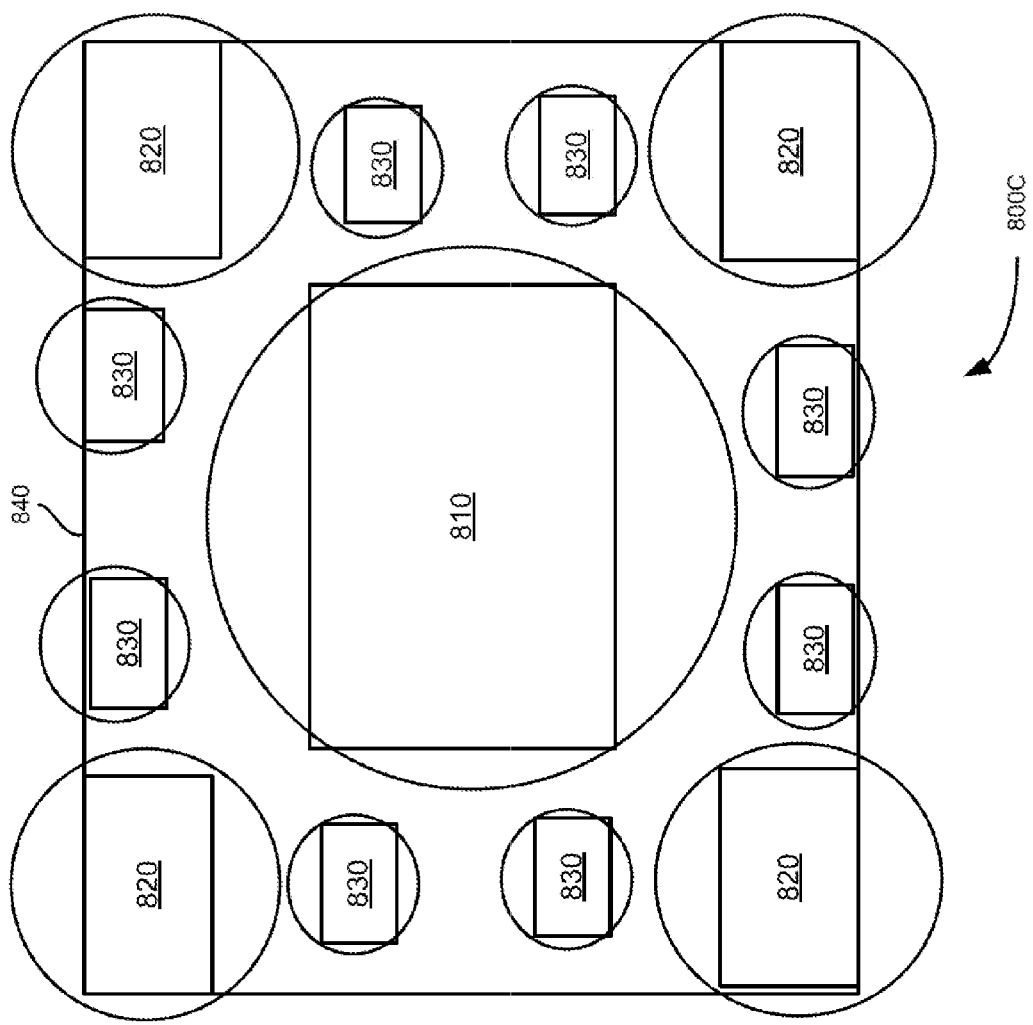

In some embodiments, the first resolution of the central camera is a higher resolution central camera. The one or more resolutions of the camera clusters that are different from the first resolution are lower resolution than the higher resolution of the central camera as shown in FIGS. 2 to 8. Further in these embodiments, the central camera of each cameral cluster has a higher resolution than the resolutions of the remaining cameras in the camera cluster as shown in FIGS. 2 to 8. In some embodiments, the cameral clusters are radially positioned substantially around the central camera as shown in FIGS. 2, 3, 4 and 8. Also in some embodiments, the central camera and the camera clusters are formed by directly disposing the camera lenses on a semiconductor wafer chip as shown in FIGS. 8A, 8B and 8C.

FIGS. 2-5 illustrate radial pattern camera clusters including two resolution camera sets which can be built using individual camera modules. FIGS 6B and 6C illustrate a camera cluster having two large cameras instead of one central camera to facilitate implementation of stereo. FIGS. 8A 8B, and 8C illustrate monolithic wafer implementation of camera clusters, which are formed by disposing nine, five and thirteen lenses (810-830), respectively on wafer based image sensor. In these embodiments, the disposed lenses do not overlap with each other. The circles around the lenses represent the sensor area used by lenses. For example, five lens solution shown in FIG. 8B allows to have larger individual sensor area which represent larger output resolutions, while the thirteen camera solution shown in FIG. 8C provides better silicon utilization and can result in a better depth map quality. The seven camera solution shown in FIG. 8A is shown an in-between the embodiments shown in FIGS. 8B and 8C for completeness. The smallest cameras shown in the seven and thirteen camera solutions (FIGS. 8A and 8C) can be of clear color.

In some embodiments, the central camera and the camera clusters are disposed in a mobile computing device. Example mobile computing device are a smart phone, a tablet, a portable digital camera, a personal computer and the like.

Also, although certain terms are used primarily herein, other terms could be used interchangeably to yield equivalent embodiments and examples. For example, the term "computing system" may be used interchangeably with "physical host", "physical machine" or "physical device". Further for example, it is well-known that equivalent terms in the field of mobile computing system or similar or related fields could be substituted for such terms as "mobile computing device," "mobile device," or the like.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 9:
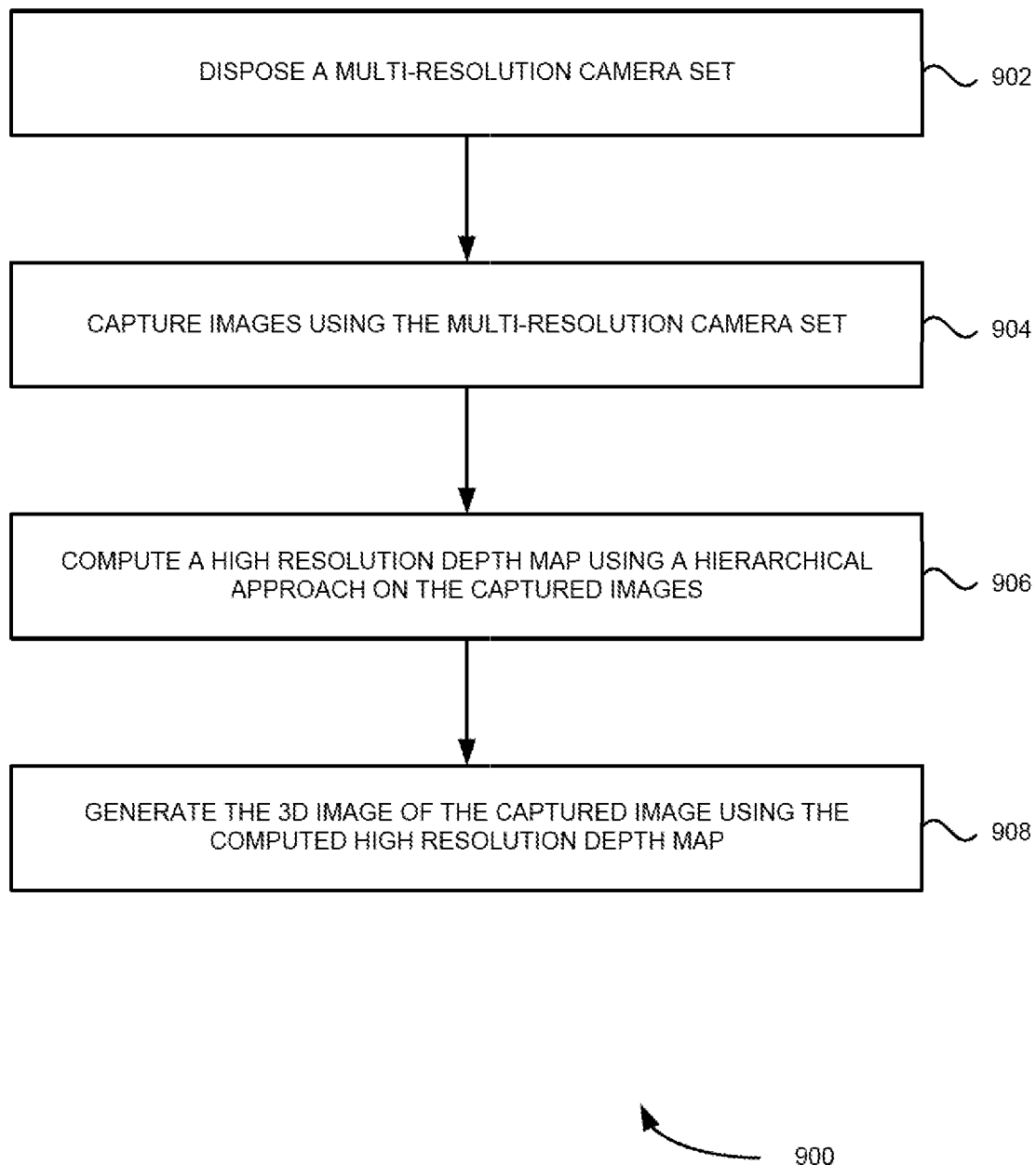
FIG. 9 is a flow diagram of process for generating 3D images using multi-resolution camera cluster, according to an example embodiment.

FIG. 9 is a flow diagram of process 900, for generating 3D images using multi-resolution camera clusters, according to an example embodiment.

At block 902, process 900, disposes a multi-resolution camera set including a central camera, having a first resolution, and multiple camera clusters, having one or more resolutions that are different from the first resolution, that are positioned substantially surrounding the central camera as shown in FIGS. 2-7. At block 902, images are captured using the disposed multi-resolution camera set. In these embodiments, the central camera having the first resolution has a higher resolution than the cameras in the multiple camera clusters. Also in these embodiments, the camera clusters having the one or more resolutions that are different from the first resolution includes the cameral cluster having the one or more resolutions that are lower resolution than the central camera having the higher resolution. Further in these embodiments, the central camera of each cameral cluster has a higher resolution than the resolutions of the remaining cameras in the camera cluster. Furthermore in some embodiments, the cameral clusters are radially positioned substantially around the central camera. The wafer based embodiments shown in FIGS. 8A to 8C, the central camera and the camera clusters are formed by directly disposing the camera lenses on a semiconductor wafer chip including an image sensor. In some embodiments, the central camera and the camera clusters are configured to be disposed in a mobile computing device. Example mobile computing devices are a smart phone, a tablet, a portable digital camera, a personal computer, and the like. In some embodiments, At block 906, a high resolution depth map is computed using a hierarchical approach on the captured images. In some embodiments, the hierarchical approach includes computing low-resolution depth maps using captured images associated with camera clusters having lower resolution in the camera set using relatively small depths. The computed low-resolution depth maps are then refined. A high-resolution depth map is then computed using the captured images associated with the central camera and central cameras of each of the multiple camera clusters and the refined computed low-resolution depth maps.

At block 908, the 3D image of the captured image is then generated using the computed high resolution depth map.

In some embodiments, the multi-resolution camera set is disposed on a flash of a DSLR or a high end DSC and further configured to use flash interface to produce synchronized shots from the multi-resolution camera set disposed on the DSLR camera and/or the high end DSC.

Process 900 for generating 3D images using multi-resolution camera clusters is explained in more detail above with reference to the system diagram 100 shown in FIG. 1.

In an example embodiment, components/modules of 3D image generation module 160 are implemented using standard programming techniques. In other embodiments, 3D image generation module may be implemented as instructions processed by a processor that executes as one of other programs.

Furthermore, in some embodiments, some or all of the components of 3D image generation module 160 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for optimizing guest OS utilization cost in a processor based licensing model in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

Computational pipeline for generation of 3D high resolution images:

This computational pipeline is described in two sections: overall algorithm description, which provides overall descriptions of major functional blocks; and detailed algorithm descriptions of individual functional blocks, which are specific to implementation of this invention.

Overall agorithm description:

This section presents two embodiments of a computational pipeline for generation of a high resolution depth map, which is a main part of the generation of 3D high resolution images. These embodiments are:

regular 3D high resolution mode for depth map generation for two resolution cluster or single cluster camera set, and hierarchical 3D high resolution mode for depth map generation for camera set with central high resolution camera surrounded by several radial positioned clusters.

Overall algorithm description section also includes hierarchical high dynamic range 3 D high resolution mode for camera set with central high resolution camera surrounded by several radial positioned clusters. It is desirable, in order to achieve quality depth map, to have at least two cameras on each radius and at least three radial directions are needed to see scene from different viewpoints.

Figure 10:
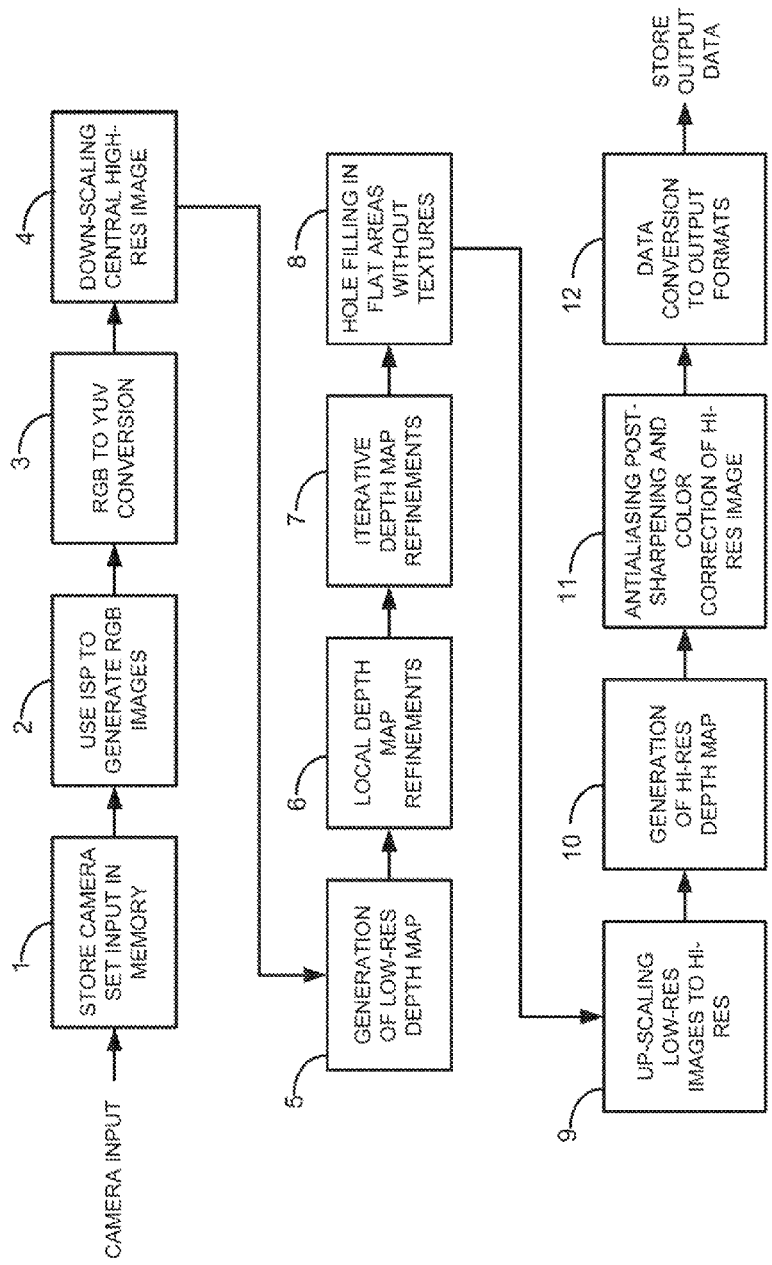
FIG. 10 shows the flow diagram of high resolution depth map generation for two resolution cluster or single cluster.

Regular 3D high resolution mode for depth map generation for two resolution cluster or single cluster camera set:

The descriptions in this section are following, FIG. 10 diagram:

For regular 3D high resolution mode, images in the camera set are being captured at approximately the same time and stored in the main memory typically using MIPI interface (block 1 of FIG. 10). Then, in order to minimize power consumption, the initial stage of computation pipeline utilizes ISP to perform demosaicking and other operations required to generate RGB images for all cameras.

Images stored in memory are being sent to ISP one by one and the resulting RGB images will be sent back to store them in the memory (block 2 of FIG. 10).

The next step is to convert images to YUV or YCrCb formats. The main objective is to use the luma component Y as a main source of depth computations in multi-camera parallax and having chroma components playing complimentary role. It is also possible to generate YUV or YCrCb using dedicated hardware already available on some of the devices (block 3 of FIG. 10).

In order to minimize the amount of depth map computations, the initial stage of depth map generation is being performed at low resolution. High resolution of depth map is being downscaled to low resolution to match the resolution of surrounding images. It is desirable from computational point of view to have low resolution images to have half of the resolution of high resolution image (block 4 of FIG. 10).

The next stage is to use multi-view parallax techniques to compute depth map for every pixel visible by two or more cameras. This is being done by computing parallax shift for every depth using all cameras from which the particular pixel is visible and finding the best match. It is important at this stage to determine which cameras do not see this pixel and to exclude them from computations for given pixel. The use of partial summations and computations along the epipolar lines will help to reduce total amount of computations and to make final result accurate. All initial parallax computations had been performed using intensity Y color component (block 5 of FIG. 10). The algorithm description of this block is similar to generation of low resolution depth map in detailed algorithm description section.

After the initial depth map is generated, local refinements are performed using color (chroma) information. For example, the intensity (luma) for a given pixel is the same as for their neighborhood but there is a color edge or other color texture feature to match the unique position of this pixel by several cameras (block 6 of FIG. 10).

The next step is to use depth map to warp block by block image from central camera to other cameras and try to accurately match image block using iterative minor modifications of depths for this block in order to increase depth resolution of the depth map (block 7 of FIG. 10).

At this time, there are still holes in the depth map for the flat areas which have no texture and occluded pixels visible by only one camera. Such holes could be filled by using extrapolation methods moving from the boundary of the hole to its interior. All pixels in these areas must be filled (block 8 of FIG. 10).

After the best low resolution depth map is generated, the low resolution images are unsealed to match the resolution of central camera and then finally to generate high resolution depth map. At this stage, it is not needed to try all depths as in initial low resolution depth map computations but rather up-scale low resolution depth map to high resolution and then use this high resolution depth map as a starting point (block 9 of FIG. 10).

The high resolution depth map generation involves refining process of the unsealed depth map. It will be using the limited number of depths close to unsealed depth map in most of the cases. This process will increase the depth resolution and improve pixel accuracy of the depth Map. Special care must be taken for the occlusion zones and in the neighborhood of "silhouette edges" where depth values could be changed substantially (block 10 of FIG. 10).

The new type of antialiasing has been introduced and is part of this invention. Traditional antialiasing in computer graphics is being performed by generating image, which has resolution higher than resolution of the final output and then using special down-sampling filters. According to this invention, super-resolution image is not generated, but additional information per pixel such as, upscaled low resolution images and final depth map are generated. Warping pixels from these images to high resolution image and adding them with relatively low weights to the original high resolution image is the essence of this new antialiasing method (block 11 of 10).

The resulting high resolution image and high resolution depth map could be stored as raw data or being compressed to different file formats. Final output data could be stored in memory or sent out via Internet (block 12 of FIG. 10). There are several ways to store the data. The major choices are:

RGB or YUV image plus depth map;

original raw data of camera input to allow offline post-processing of data, which has less computational constrains and therefore allows to receive accurate results; and original compressed data, final RGB or YUV image plus depth map. This will allow later offline post-processing.

Figure 11:
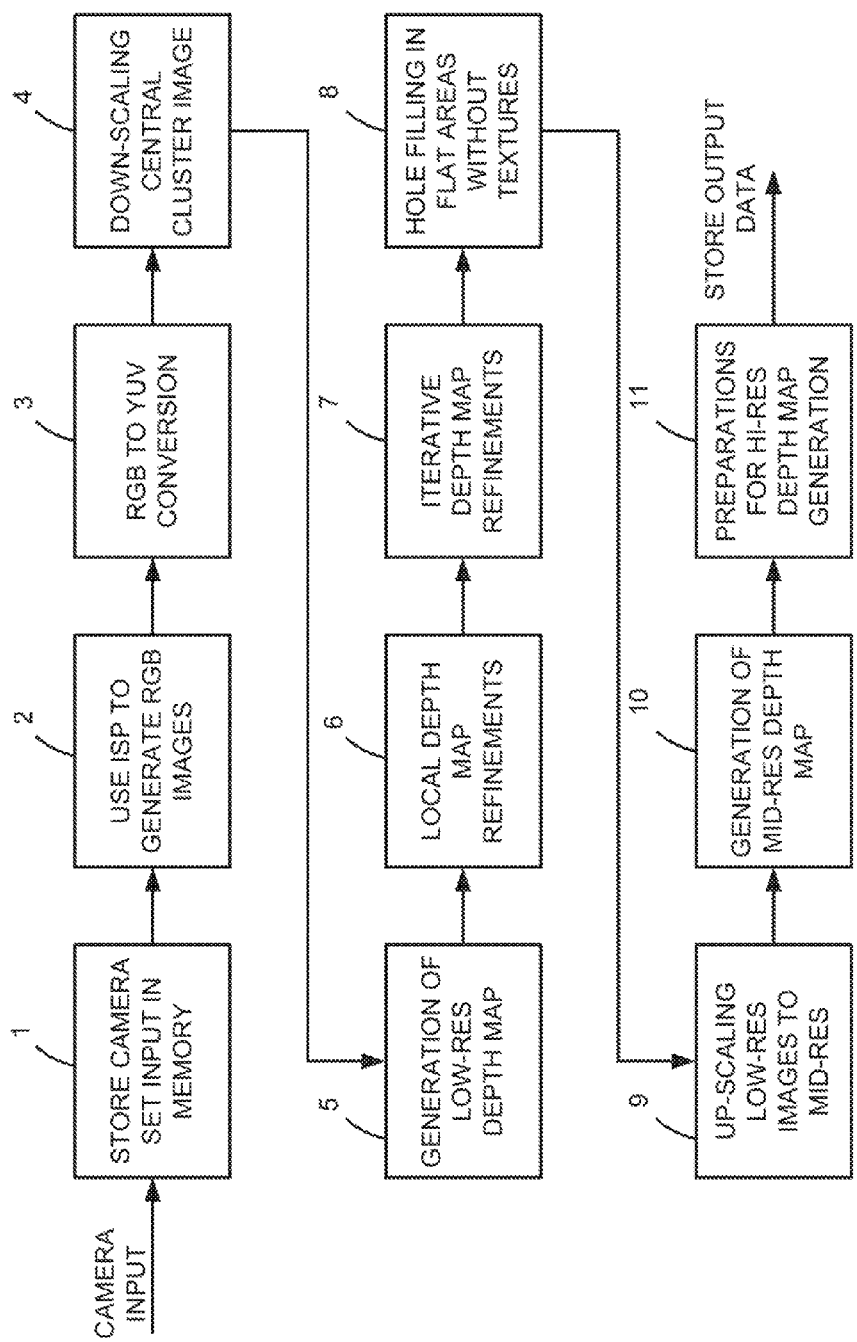
FIG. 11 illustrates stage one of hierarchical high resolution depth map generation, which includes generation of medium resolution depth maps for clusters.
Figure 12:
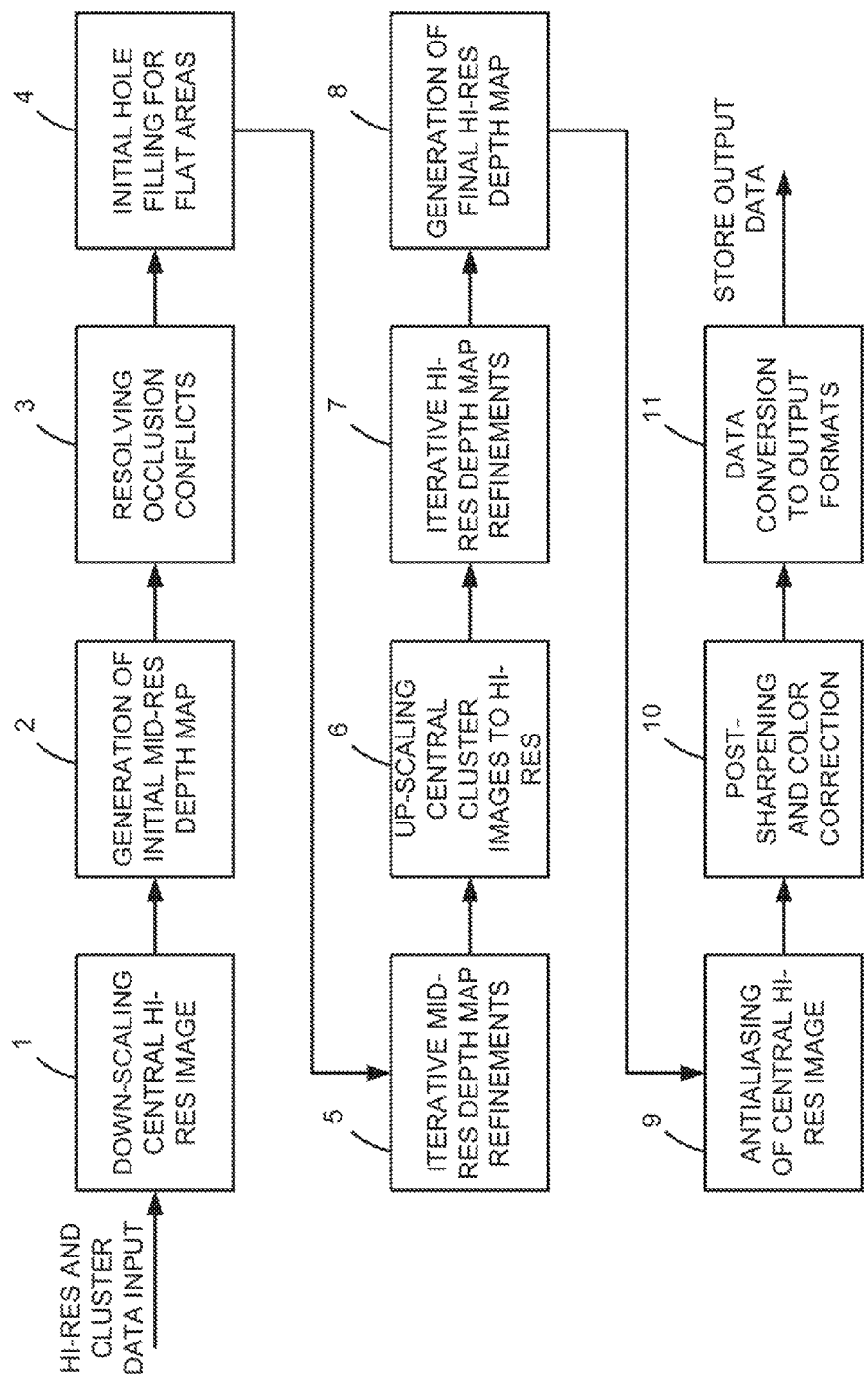
FIG. 12 illustrates second stage of hierarchical high resolution depth map generation using clusters.

Hierarchical 3D High Resolution Mode for Depth Map Generation for Camera set with Central High Resolution Camera Surrounded by several radial positioned Clusters This mode description follows pipeline reflected in FIG. 11 and FIG. 12, There is a similarity between this mode and non-hierarchical 3D high resolution mode described in previous section. This section will describe the differences and will refer to appropriate blocks of previous section, which have the same functionality.

Camera input takes all camera input from the camera set and stores all images in memory (block 1 of FIG. 11).

Then, depth maps for clusters may be generated, one cluster at a time exactly as it described in previous section (block 2 to block 10 of FIG. 11) work exactly as it described in corresponding blocks of FIG. 10.

Block 11 of FIG. 11 is preparing resulting depth maps for clusters and stores them in the memory.

Block 1 of FIG. 12 down-scaling High resolution central image to match the resolution of central images of the clusters.

The next step is to generate medium resolution depth map using central camera, central cameras the clusters and clusters depth maps to generate medium resolution Depth Map with higher depth resolution. (block 2 of FIG. 12).

Then use depth maps of clusters and newly created depth map to resolve occlusions by comparing for which pixels there is a big difference between depth map of clusters and new depth map. (block 3 of FIG. 12).

Block 4 to block 11 of FIG. 12 behave practically the same as the corresponding blocks in FIG. 10.

Figure 13:
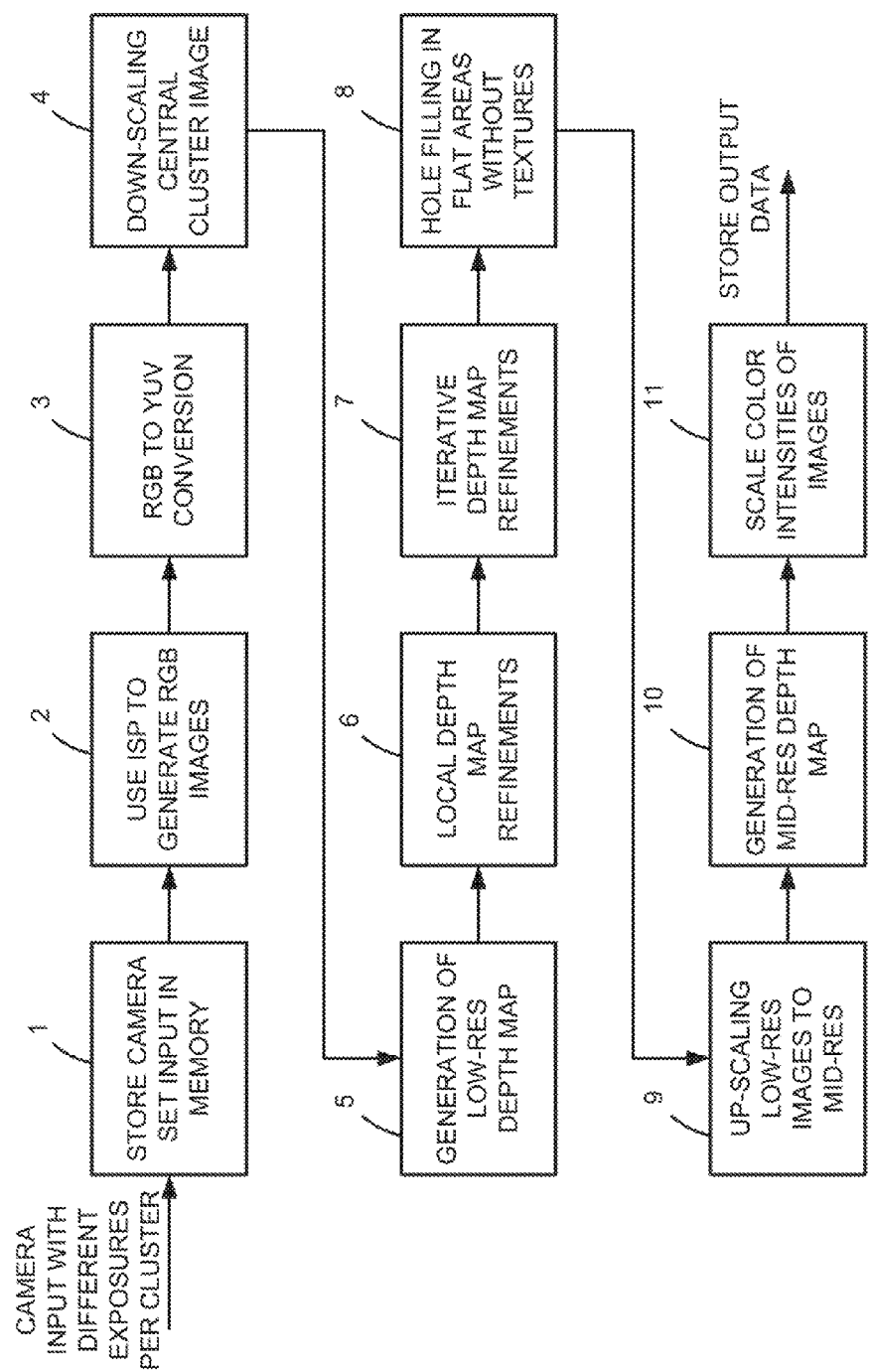
FIG. 13 illustrates stage one of hierarchical high resolution depth map generation for HDR, which is generation of medium resolution depth maps for clusters.
Figure 14:
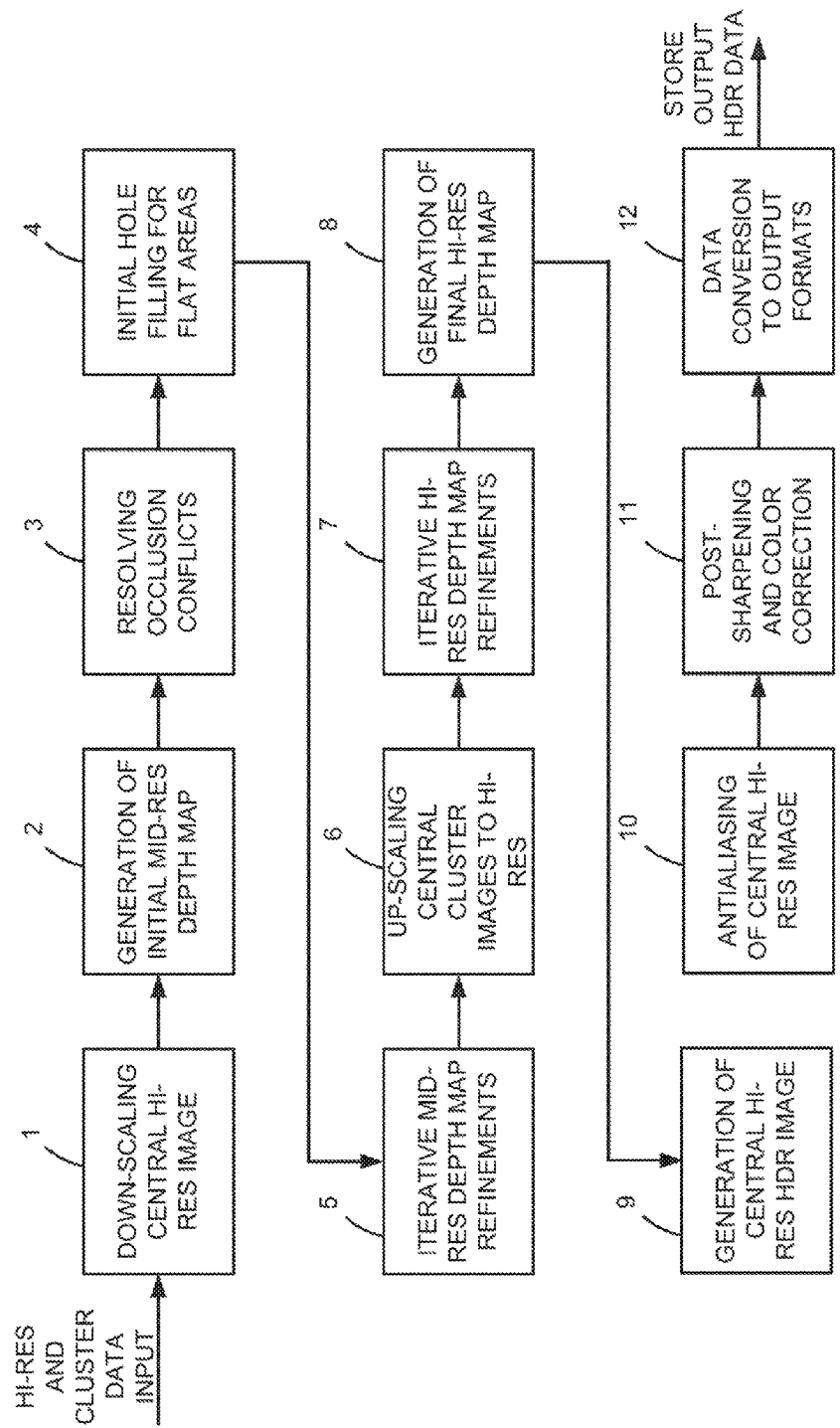
FIG. 14 illustrates second stage of hierarchical high resolution depth map generation for HDR using clusters.

Hierarchical high dynamic range 3D high resolution mode for camera set with central high resolution camera surrounded by several radial positioned clusters:

This mode of description follows pipeline reflected in FIG. 13 and FIG. 14. In this mode, computational pipeline is similar to pipeline described in previous section. The differences are:

Exposure time for central camera in camera set and for some clusters are different. Some clusters have shorter exposure time than central camera to better reflect overexposed areas of the image and some clusters have longer exposure than central camera to better reflect underexposed areas of the image (input to block 1 of FIG. 13).

Depth maps computations for individual clusters (block 1 to block 10 of FIG. 13) are computed the same way as described in previous section in FIG. 11.

After depth maps for individual clusters had been generated, an additional step of scaling the intensity of the images need to be performed in order to match intensity and exposure for central high resolution camera and clusters (block 11 of FIG. 13).

For pixels underexposed in central camera intensity levels (near the black level) or overexposed in central camera (near the saturation level), the depth for these particular pixels will be taken from corresponding clusters with high and low exposure time. For the central part of color intensity range of the central camera, the depth map is computed the same way as for regular generation of high resolution depth map. Take in account this difference the rest of the depth map generation (block 1 to block 8 of FIG. 14) is being performed using the same algorithms as described in previous section (block 1 to block 8 of FIG. 12).

The final generation of high resolution HDR is being done on the same way of handling over exposed and under exposed pixels as described in previous paragraph (block 9 of FIG.14). The last stage is the actual HDR image generation (block 10 to block 12 of FIG. 14). It is similar to (block 8 to block 11 of FIG. 12), but the color correction for HDR (block 12 of FIG. 14) may have additional tone curve algorithm applied to the final HDR image in order to fit it to output storage format.

Detailed algorithm descriptions of individual functional blocks:

The following are detailed algorithm descriptions of regular 3D high resolution mode for depth map generation for two resolution cluster or single cluster camera set.

Figure 15:
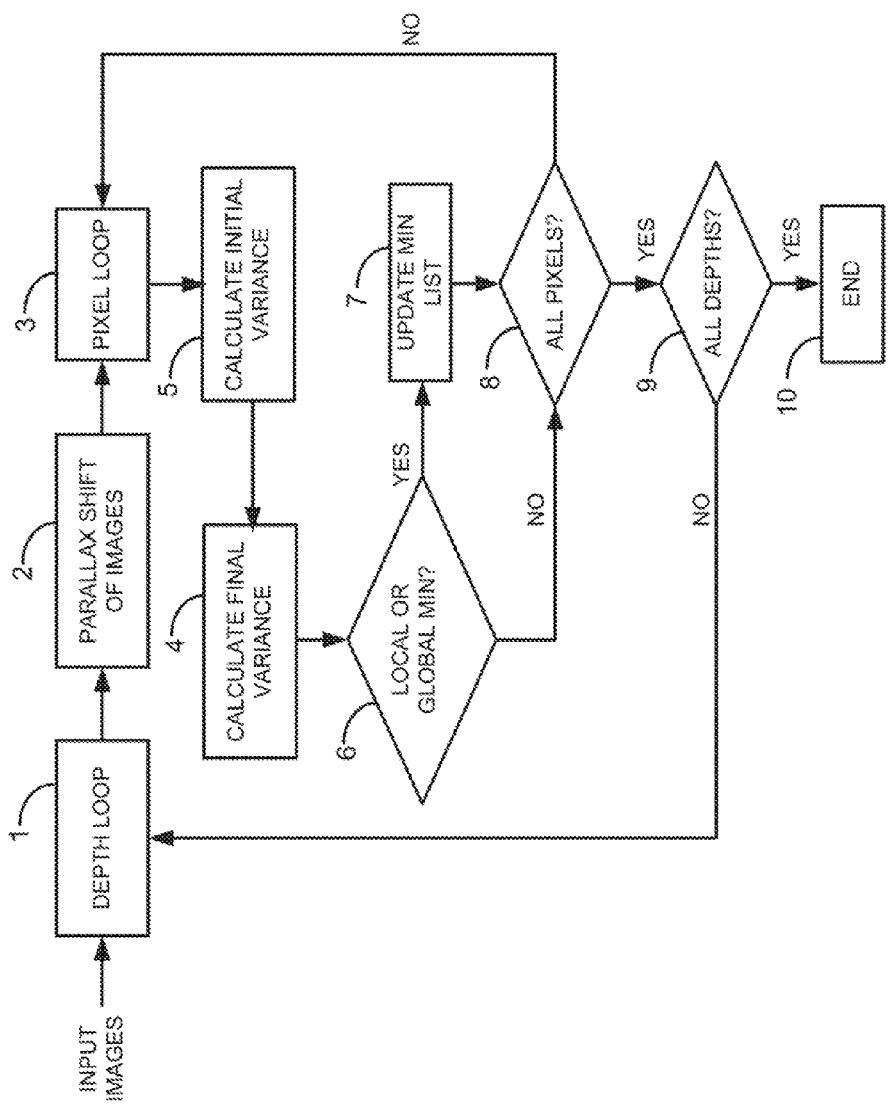
FIG. 15 shows the flow diagram of initial generation of low resolution depth map.

Initial generation of low resolution depth map:

In this algorithm, parallax shift is performed for all pixels in all images to match corresponding pixels in reference image. Because parallax shift is proportional to inverse distance to the camera, inverse distances (disparities) are used in the depth map calculations. Parallax shift is also depending on distance between cameras and it is constant for given camera at given depth. FIG. 15 illustrates initial depth generation. Because at this time, actual depth is not known, this operation is performed for all depths in the initial depth set (block 1 of FIG. 15). Based on given depth, parallax shift is performed for all images and the shifted images are generated (block 2 of FIG. 15). The next step is for every pixel in reference image, where an attempt is made to find best match of this pixel neighborhoods for all images in order to find the best matching pattern. Typically, this neighborhood could be 3×3 or 5×5 (block 3 of FIG. 15), Actual pattern matching is done by computing the sum of variances between corresponding pixels of reference and other images. During these computations, Min and Max deltas between reference and other pixels in the neighborhood can be found (block 5 of FIG. 15). Then for each pixel, Min and Max deltas can be disregarded and the final variance can be recomputed (block 4 of FIG. 15). The recomputed variance for pixels depths and for two previous depth levels can be stored and Min list for every pixel which contains global and local Min variances is maintained. Variance of current depth is checked for global Min and variance of previous depth is checked for local (block 6 of FIG. 15). Depth with global Min value will go as a pixel depth for the depth map. Depths from local depth Min list will be used as input to depth map refinements algorithm. Min list can be updated (block 7 of FIG. 15). Then the process described above can be continued until all pixels for all depths in initial depth set are processed (blocks 8 and 9 of FIG. 15).

Figure 16:
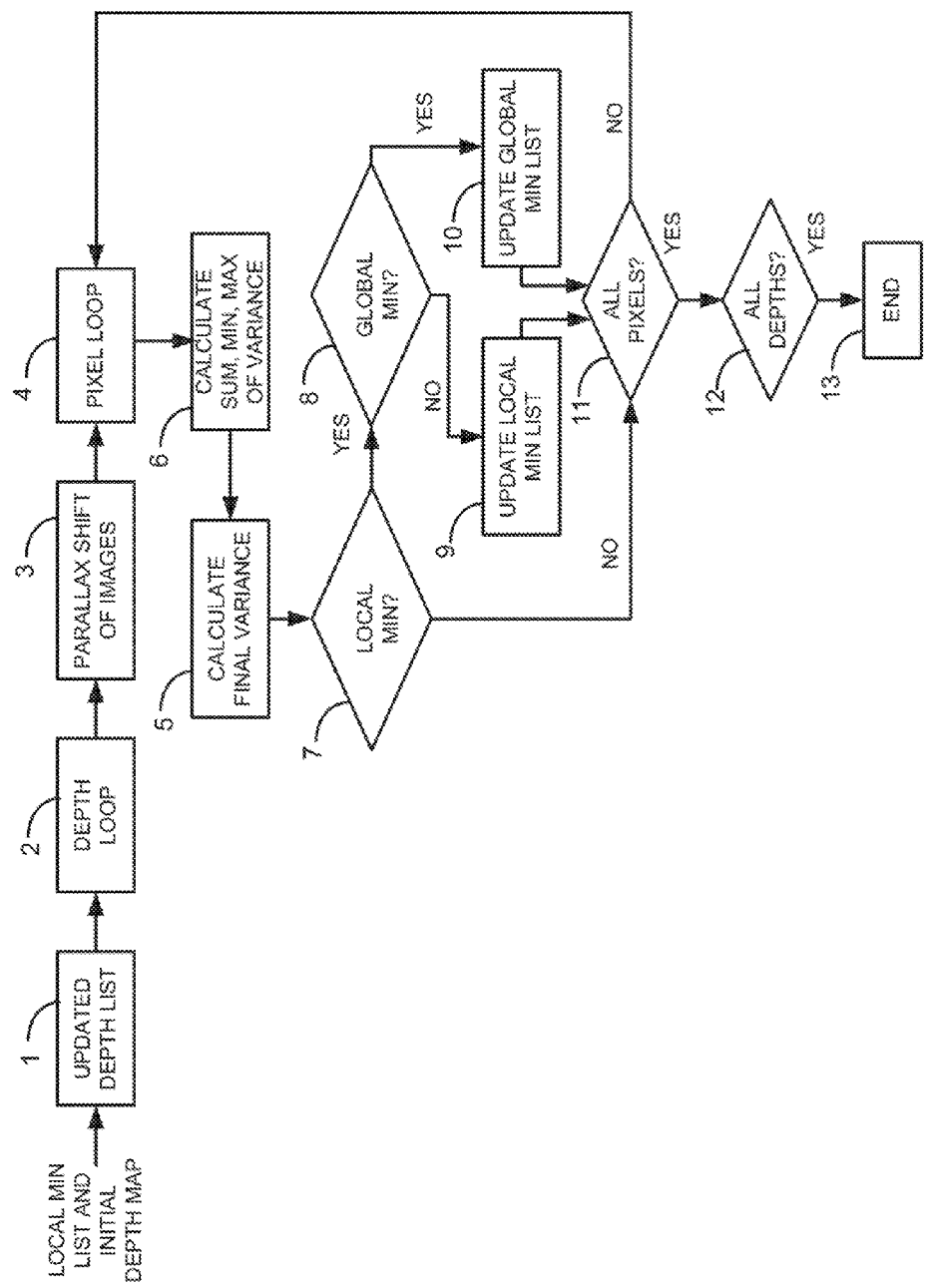
FIG. 16 shows the flow diagram of depth map refinements.

Local depth map refinements:

The main goal of this algorithm is to compute depth map with higher depth resolution. At this stage, just refinements of the global depth may not be sufficient because sometimes the refinements of the local Min depths may produce actual global depths. FIG. 16 illustrate this algorithm using blocks 1 to 13. The refinement process starts with local depth list and create an updated depth list which contains number of additional depths around local Min depths. Then for this set of depths, the algorithm described in previous section can be repeated.

Figure 17:
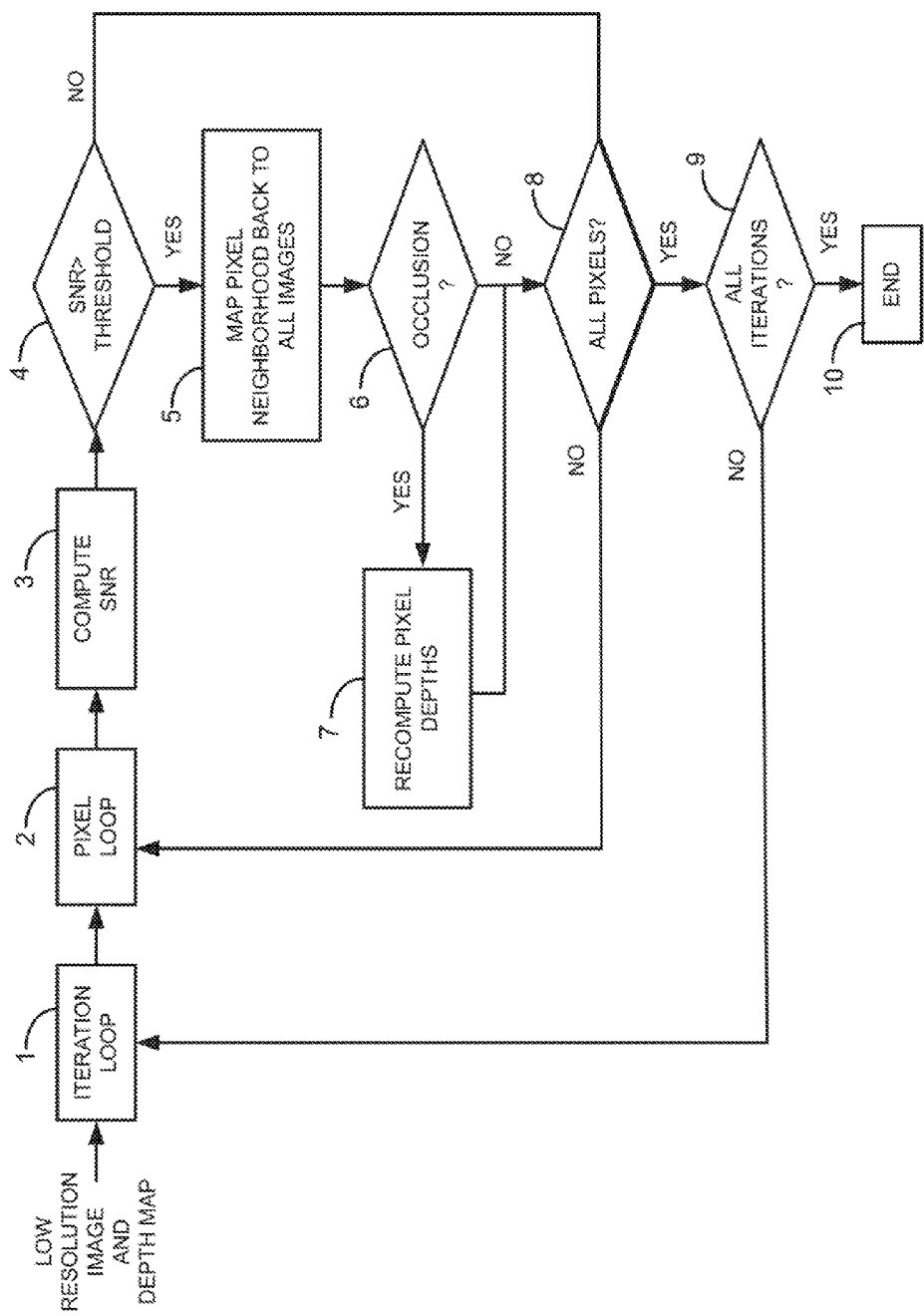
FIG. 17 shows the flow diagram of iterative depth refinements.

Iterative depth map refinements:

Iterative depth map refinements at low resolution is an optional step. It will be performed only if there is single cluster implementation, otherwise this algorithm will be applied only at high resolution. These refinements will be performed on the neighborhood of edges. Source to Noise Ratio (SNR) may be used to define these areas. Special attention may be paid to "silhouette" edges i.e., the edges where there is a jump in depth between different sides of the edge. The silhouette edges may indicate that there could be occlusion zones for some cameras. Details of this algorithm are illustrated in FIG. 17. The input to this algorithm are low resolution images, down-scaled central image, and refined depth map. There will be one or more iterations in this process. Each iteration will process all pixels in reference image (blocks 1 and 2 of FIG. 17). For each pixel in the reference image, SNR may be computed, The SNR block size should be 5×5 or 7×7. It may use "camera calibration data", "camera noise model", and "predefined threshold", which are specific for particular vendor and vendor's model (block 3 of FIG. 17). Then SNR is compared to threshold (block 4 of FIG. 17), and if SNR value for particular pixel is above the threshold, then parallax warping of pixels in neighborhood of this pixel from reference image can be performed using current depth map to all other images and compute corresponding variances (block 5 of .FIG. 17). If variance for one or more images is substantially higher than variance for other images (block 6 of FIG. 17), then it can be concluded that this image and this particular pixel is occluded and pixer's depth value excluding occluded pixels is recomputed (block 7 of FIG. 17) and this depth value is stored in the depth map. After all pixels are completed, the process is repeated in the next iteration using updated depth map (blocks 8 and 9 of FIG. 17).

The hole filling in flat areas without textures:

Because depth map for these areas is not defined, one of the extrapolation methods that moves inward from the boundary of these areas is selected, where depths are defined. There are number of ways to perform such operation. The simplest method is to use "sliding window" on computed depth map. This window could be 3×3 or 5×5. The same method could be used to fill depths in occlusion areas.

Up-scaling low resolution images to high resolution:

At this time, consider using the standard up-scaling methods currently used on the target system. Typical options are:
Bilinear Up-scaling.
Bicubic Up-scaling.
Polyphase Up -scaling.
Custom Up-scaling, The quality of final depth map depends on the quality of up-scaling. Therefore, it is important to have the best up-scaling algorithm available on the system. In addition to up-scaling low resolution images, low resolution depth map can be up-scaled using the same up-scaling algorithm.

Generation of high resolution depth map:

Algorithm for generation of high resolution depth map use the following input:
up-scaled low resolution images; and
up-scaled low resolution depth map.

Actual algorithm is essentially the same as the generation of low resolution depth map and should use up-scaled low resolution depth map, up-scaled low resolution images and central high resolution image (blocks 6, 7, and 8 of FIG. 10).

The invention claimed is:

1. A method for generating a three-dimensional (3D) image using multi-resolution camera dusters, comprising:
disposing a multi-resolution camera set including a central camera, having a first resolution, and multiple camera clusters, having one or more resolutions that are different from the first resolution, that are positioned substantially surrounding the central camera;
capturing images using the multi-resolution camera set;
computing a high resolution depth map using a hierarchical approach on the captured images by a 3D image generation module residing in a computing device, wherein the hierarchical approach to computing the high resolution depth map comprises:
computing low resolution depth maps using luma information of each pixel in captured images associated with camera clusters having lower resolution in the camera set using relatively small depths;
refining the computed low resolution depth maps using chroma information of each pixel in the captured images, wherein the refined computed low resolution depth map is having higher depth resolution than the computed low resolution depth maps; and computing a high resolution depth map using the captured images associated with the central camera and central cameras of each of the multiple camera clusters and the refined computed low resolution depth maps; and generating the 3D image of the captured image in the computing device using the computed high resolution depth map.

2. The method of claim 1, wherein the central camera having the first resolution comprises the central camera having a higher resolution than the cameras in the multiple camera clusters.

3. The method of claim 2, wherein the camera clusters having the one or more resolutions that are different from the first resolution comprises the camera cluster having the one or more resolutions that are lower resolution than the central camera having the higher resolution.

4. The method of claim 3, wherein a central camera of each camera cluster having a higher resolution than the resolutions of the remaining cameras in the camera cluster.

5. The method of claim 1, wherein the camera clusters are radially positioned substantially around the central camera.

6. The method of claim 1, wherein the central camera and the camera clusters are formed by directly disposing the camera lenses on a semiconductor wafer chip.

7. The method of claim 1, wherein the central camera and the camera clusters are disposed in a mobile computing device.

8. The method of claim 1, wherein the mobile computing device comprises a smart phone, a tablet, a portable digital camera, and/or a personal computer.

9. The method of claim 1, wherein the multi-resolution camera set is disposed on a flash of DSLR or a high end DSC and further configured to use flash interface to produce synchronized shots from the multi-resolution camera set disposed on the DSLR camera and/or the high end DSC.

10. A non-transitory computer-readable storage medium including instructions that are configured, when executed by a computing system, to perform a method for generating a three-dimensional (3D) image using multi-resolution camera dusters, the method comprising:

disposing a multi-resolution camera set including a central camera, having a first resolution, and multiple camera clusters, having one or more resolutions that are different from the first resolution, that are positioned substantially surrounding the central camera;

capturing images using the multi-resolution camera set;

computing a high resolution depth map using a hierarchical approach on the captured images by a 3D image generation module residing in the computing device, wherein the hierarchical approach to computing the high resolution depth map comprises:

computing low resolution depth maps using luma information of each pixel in captured images associated with camera clusters having lower resolution in the camera set using relatively small depths;

refining the computed low resolution low resolution depth maps using chroma information of each pixel in the captured images, wherein the refined computed low resolution depth map is having higher depth resolution than the computed low resolution depth maps; and computing a high resolution depth map using the captured images associated with the central camera and central cameras of each of the multiple camera clusters and the refined computed low resolution depth maps; and generating the 3D image of the captured image in the computing device using the computed high resolution depth map.

11. The non-transitory computer readable storage medium of claim 10, wherein the central camera having the first resolution comprises the central camera having a higher resolution than the cameras in the multiple camera clusters.

12. The non-transitory computer-readable storage medium of claim 11, wherein the camera clusters having the one or more resolutions that are different from the first resolution comprises the camera cluster having the one or more resolutions that are lower resolution than the central camera having the higher resolution.

13. The non-transitory computer-readable storage medium of claim 12, wherein a central camera of each camera cluster having a higher resolution than the resolutions of the remaining cameras in the camera cluster.

14. The non-transitory computer-readable storage medium of claim 10, wherein the camera clusters are radially positioned substantially around the central camera.

15. A mobile computing device for generating a 3D image using multi-resolution camera clusters, the mobile computing device comprising:

a multi-resolution camera cluster set disposed in the mobile computing device;

a processor coupled to the multi-resolution camera cluster set, wherein the multi-resolution camera cluster set includes a central camera, having a first resolution, and multiple camera clusters, having one or more resolutions that are different from the first resolution, that are positioned substantially surrounding the central camera; and memory coupled to the processor, and wherein the memory includes a 3D image generation module comprising instructions that are executed by the processor to:

capture images using the multi-resolution camera set;

compute a high resolution depth map using a hierarchical approach on the captured images wherein the hierarchical approach to computing the high resolution depth map comprises:

compute low resolution depth maps using luma information of each pixel in captured images associated with camera clusters having lower resolution in the camera set using relatively small depths;

refine the computed low resolution depth maps using chroma information of each pixel in the captured images, wherein the refined computed low resolution depth map is having higher depth resolution than the computed low resolution depth maps; and compute a high resolution depth map using the captured images associated with the central camera and central cameras of each of the multiple camera clusters and the refined computed low resolution depth maps; and generate the 3D image of the captured image in the mobile computing device using the computed high resolution depth map.

16. The mobile computing device of claim 15, wherein the central camera having the first resolution comprises the central camera having a higher resolution than the cameras in the multiple camera clusters.

17. The mobile computing device of claim 16, wherein the camera clusters having the one or more resolutions that are different from the first resolution comprises the camera cluster having the one or more resolutions that are lower resolution than the central camera having the higher resolution.

18. The mobile computing device of claim 17, wherein a central camera of each camera cluster having a higher resolution than the resolutions of the remaining cameras in the camera cluster.

19. The mobile computing device of claim 15, wherein the camera clusters are radially positioned substantially around the central camera.

20. The mobile computing device of claim 15, wherein the central camera and the camera clusters are formed by directly disposing the camera lenses on a semiconductor wafer chip.

21. The mobile computing device of claim 15, wherein the central camera and the camera dusters are disposed in the mobile computing device.

22. The mobile computing device of claim 15, wherein the mobile computing device comprises a smart phone, a tablet, a portable digital camera, and/or a personal computer.

23. The mobile computing device of claim 15, wherein the multi-resolution camera set is disposed on a flash of DSLR or a high end DSC and further configured to use flash interface to produce synchronized shots from the multi-resolution camera set disposed on the DSLR camera and/or the high end DSC.

* * * * *